(12) United States Patent
Azizi (10) Patent No.: US 8,306,101 B2
(45) Date of Patent: Nov. 6, 2012

(54) EQUALIZER SYSTEM

(75) Inventor: Seyed Ali Azizi, Eningen (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 1032 days.

(21) Appl. No.: 10/488,958

(22) PCT Filed: Aug. 27, 2002

(86) PCT No.: PCT/EP02/09559
§ 371 (c)(1),
(2), (4) Date: Oct. 15, 2004

(87) PCT Pub. No.: WO03/023989
PCT Pub. Date: Mar. 20, 2003

(65) Prior Publication Data
US 2005/0041731 A1 Feb. 24, 2005

(30) Foreign Application Priority Data
Sep. 7, 2001 (DE) ................... 101 43 933

(51) Int. Cl.
*H03H 7/30* (2006.01)
*H04B 3/14* (2006.01)
*H03G 5/00* (2006.01)
(52) U.S. Cl. .................. 375/232; 333/28 R; 381/103
(58) Field of Classification Search .......... 375/229–237; 333/28 R, 24 R, 4 R, 17.1, 18, 28 T; 381/103, 381/98, 99
See application file for complete search history.

(56) References Cited

U.S. PATENT DOCUMENTS

| | | | | |
|---|---|---|---|---|
| 3,733,564 A * | 5/1973 | Kao | ................................ | 333/18 |
| 3,930,127 A * | 12/1975 | Warren et al. | ................. | 379/282 |
| 4,186,274 A * | 1/1980 | Mayshar | ....................... | 381/103 |
| 4,316,060 A | 2/1982 | Adams et al. | ..................... | 179/1 |
| 4,340,780 A * | 7/1982 | Odlen | ........................... | 381/103 |
| 4,612,665 A * | 9/1986 | Inami et al. | ..................... | 381/98 |
| 4,845,758 A * | 7/1989 | Op de Beek et al. | .......... | 381/98 |
| 4,939,782 A * | 7/1990 | Gambacurta et al. | ......... | 381/103 |
| 5,172,417 A | 12/1992 | Iwamura | ....................... | 381/103 |
| 5,530,769 A * | 6/1996 | Saitoh | .......................... | 381/103 |
| 5,581,621 A * | 12/1996 | Koyama et al. | ............... | 381/103 |
| 5,727,066 A * | 3/1998 | Elliott et al. | ..................... | 381/1 |
| 5,917,855 A * | 6/1999 | Kim | ............................... | 375/229 |
| 7,092,537 B1 * | 8/2006 | Allred et al. | .................. | 381/103 |
| 7,274,794 B1 * | 9/2007 | Rasmussen | .................... | 381/92 |

* cited by examiner

*Primary Examiner* — David C. Payne
*Assistant Examiner* — Vineeta Panwalkar
(74) *Attorney, Agent, or Firm* — O'Shea Getz P.C.

(57) ABSTRACT

In an equalizer system with a plurality of equalizers, the variation and setting of various equalizer parameters (gains, center frequencies, Q factors) may be automated by an adjustment circuit that may utilize a procedure, for example, a nonlinear curve fitting. Upon each variation, a figure of merit (e.g., cost function) may be formed and the parameter variation may continue in the direction in which the cost function decreases until it reaches a predetermined level. After each new setting of the equalizers, the procedure can be performed and the desired parameter set can be passed on to an equalizer implementing routine. External control signals may be provided to the adjustment circuit which then generates corresponding internal control signals for setting the gains of the equalizers at the respective center frequencies, the internal control signals being modified relative to the associated external control signals in such a way that the interferences occurring between the equalizers are at least reduced. Additional external control signals may be provided to the adjustment circuit for setting the center frequency and Q factor of each of the equalizers. The adjustment circuit may generate corresponding internal control signals for changing the center frequencies and Q factors of the equalizers.

28 Claims, 5 Drawing Sheets

EQUALIZER SYSTEM

1. CLAIM OF PRIORITY

This patent application claims priority to International application PCT/EP02/09559 filed on Aug. 27, 2002 and German Patent Application serial number 101 43 933.4 filed on Sep. 7, 2001.

2. FIELD OF THE INVENTION

This invention relates in general to an equalizer system, and in particular to an equalizer system having a plurality of equalizers and which utilizes an automated procedure for setting various parameters of the equalizers.

3. RELATED ART

An equalizer system is known for generating an output signal by equalizing an input signal, the equalizer system having at least two interconnected and mutually interfering equalizers that exhibit different center frequencies, whose gains at the respective center frequencies are controllable by external control signals, the input signal being spectrally weighted in dependence on the external control signals.

Such prior art equalizer systems, such as for example equalizer banks, typically comprise a set of equalizers interconnected in a certain manner within a serial, parallel, or other structure. The individual equalizers can be referred to as boost equalizers (presence equalizers) or cut equalizers (absence equalizers), that is, equalizers in which the gain is increased or decreased, respectively, at the associated center frequency.

The equalizers may be characterized parametrically by their respective gain factors, center frequencies, and Q factors (bandwidths). Embodied as corresponding filter units, the equalizers have finite bandwidths, so that connecting them together unavoidably leads to interferences between their frequency responses. As a result, the net amplitude response of the equalizer system can depart substantially from the gain factors set by the user (i.e., the gain setting). The resulting gain factors can thus be relatively much higher or much lower than the corresponding values of the gain setting, which results in unwanted coloration of the signal spectrum and an increase in the probability of overdriving.

Defects caused by interferences can typically be broken down into five categories: peaking, overdamping, gain reduction, damping reduction, and nonspecific (random) distortion of the frequency response.

Figure 1:
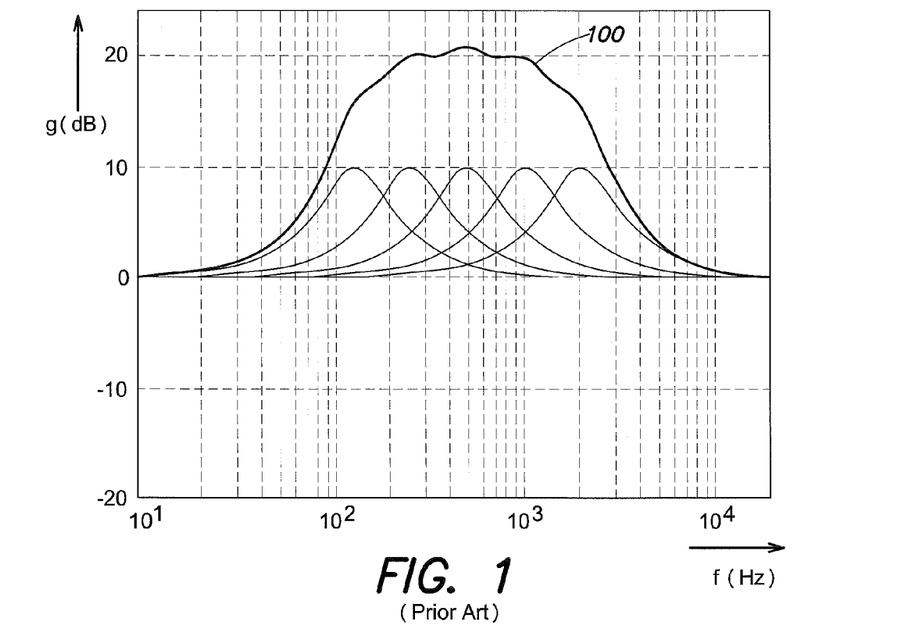
FIG. 1 illustrates a frequency characteristic of an equalizer bank with pronounced peaking.

Peaking occurs when the gains of a number of adjacent equalizers have the same arithmetic sign. In this case, the interference brings about a distinct increase or decrease in the overall equalizer bank frequency response in dependence on the arithmetic sign of the gain. The frequency response of the equalizer bank may exhibit absolute gain values that are higher than the desired settings. Under some circumstances the high gain values may result in intolerable distortions of the frequency response (coloration) and/or in a rise in the probability of overdriving. Such an effect is illustrated in FIG. 1. The gains of five adjacent equalizers of a graphic equalizer bank (not shown) by way of example are all set to +10 dB, while the gains of other equalizers in the bank are set to 0 dB. FIG. 1 illustrates the gain characteristic curves of the individual equalizers as well as the net gain characteristic curve or frequency response of the equalizer bank, illustrated by the curve 100, the peaking effect of just over +20 db being seen in the graph of the curve 100.

Figure 2:
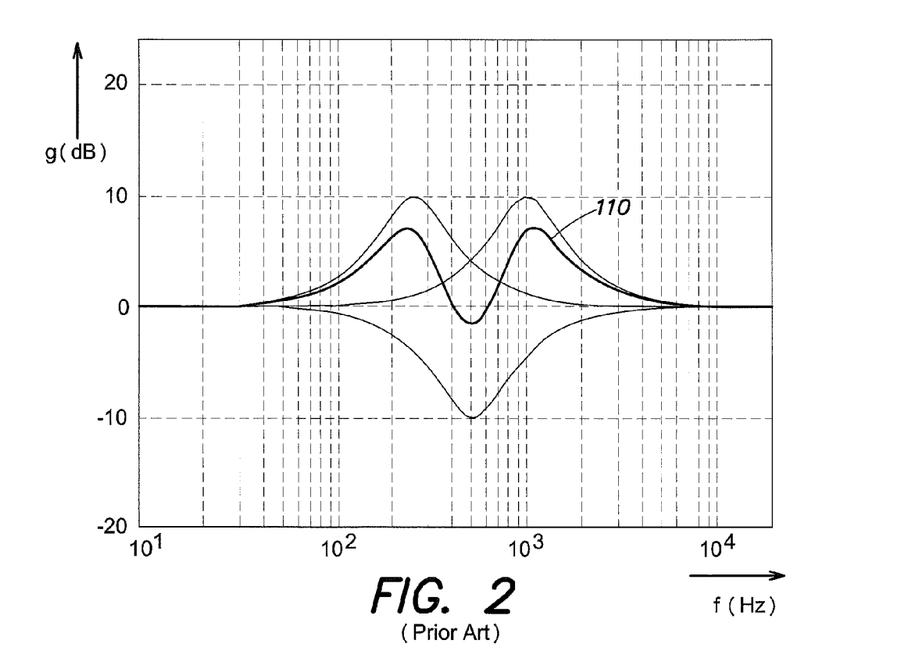
FIG. 2 illustrates a frequency characteristic of an equalizer bank with a pronounced decrease in damping.

In the case where a cut equalizer and a boost equalizer are adjacent to each other, the interference between each equalizer effects a reduction in the absolute value of the gain of the equalizer bank. As a consequence, the net gain characteristic versus frequency of an equalizer bank made up of two equalizers with opposing behavior is a reduction in the absolute value of the gain of both equalizers in comparison with the desired setting. This effect is illustrated in FIG. 2. Specifically illustrated is the gain characteristic of three adjacent equalizers in an equalizer bank (not shown), the outer two devices being boost equalizers with a positive gain of +10 dB while the middle device is a cut equalizer with a negative gain of −10 dB. FIG. 2 also illustrates the net gain characteristic curve 110 of the equalizer bank versus frequency. It can be seen that the gain of the two boost equalizers is considerably diminished while the cut equalizer is almost entirely canceled by the damping interference effect caused by the two equalizers adjacent to it.

Figure 3:
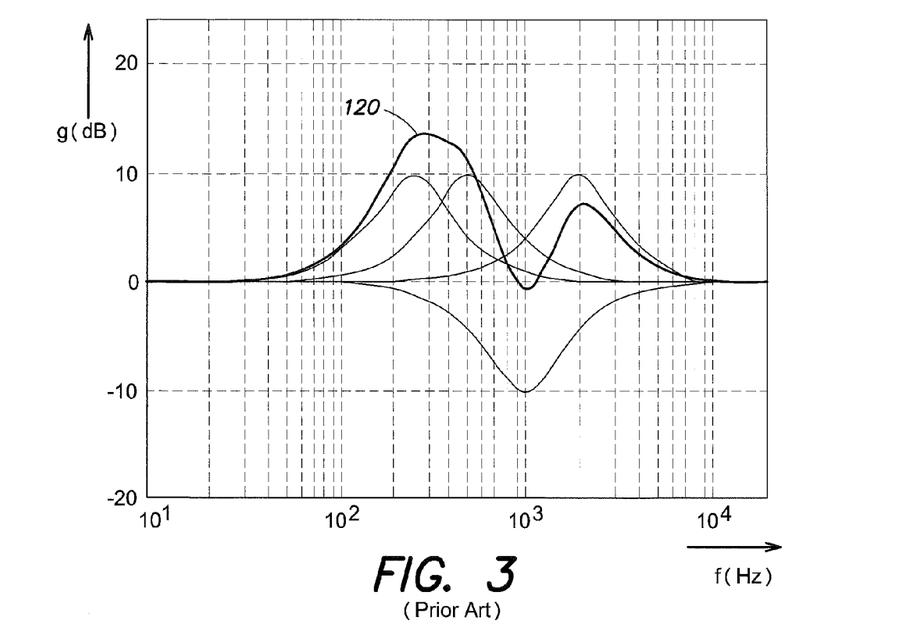
FIG. 3 illustrates a frequency characteristic of an equalizer bank with a simultaneous peaking and damping reduction.

FIG. 3 illustrates the situation where both peaking (FIG. 1) and a decrease in damping (FIG. 2) occur at the same time, resulting in the curve 120.

Figure 4:
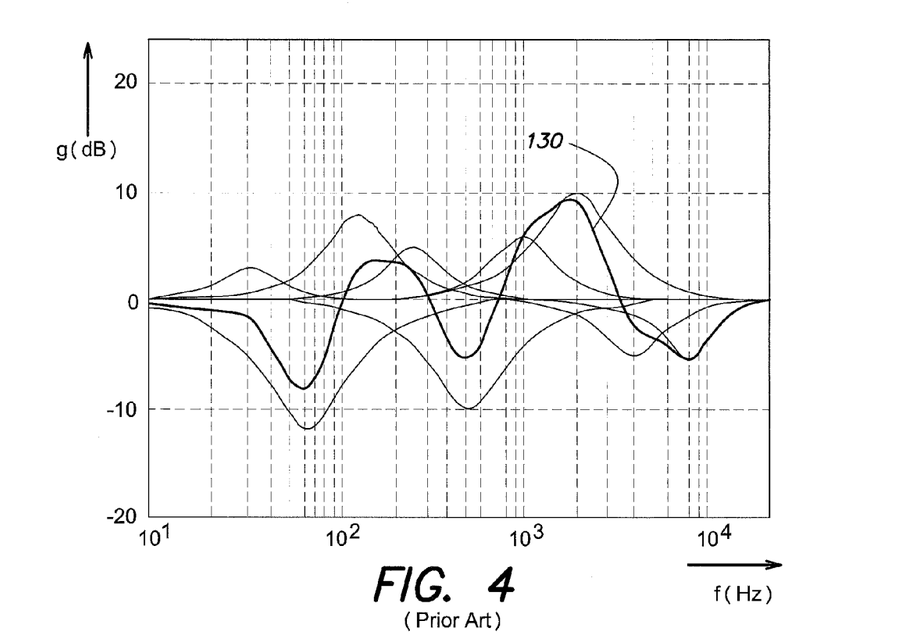
FIG. 4 illustrates a frequency characteristic of an equalizer bank with a random setting.

For the case where the gains of the individual equalizers are randomly distributed, a random combination of cut equalizers and boost equalizers also results. As a consequence, the resulting gain characteristic versus frequency is nonspecific, that is, random. FIG. 4 illustrates the gain characteristics of the individual equalizers in an example with a graphic equalizer bank exhibiting ten octave bands whose individual gains are randomly set. The resulting net gain characteristic versus frequency curve 130 illustrates the randomly distributed departures of the resulting gain from the desired gain values.

To solve this problem, it is known to vary the equalizer parameters manually in an attempt to adapt the net frequency response to the desired setting, but this has been associated with substantial manual effort and doubtful success. In the professional field, certain settings have already been realized in advance and the corresponding parameters saved. The settings and thus the associated parameter sets were then recalled in later use and made the basis for setting. This way of proceeding, however, is limited by low flexibility and a lack of suitability for real-time use.

What is needed is an equalizer system that offers a high degree of flexibility and suitability for real-time use in automated parameter setting.

SUMMARY OF THE INVENTION

In an equalizer system having a plurality of equalizers, the variation and setting of various equalizer parameters (such as, for example, gain factors, center frequencies, and/or Q factor or bandwidth) may be automated for a relatively high degree of realization of the desired setting. This is performed through use of an adjustment circuit that may utilize, for example, a procedure suitable for real-time use. Thus, for example, various parameters of the individual equalizers may be systematically varied in accordance with the procedure, for example, as part of an overall strategy. The manual effort of parameter setting is thus reduced through use of the automated parameter setting procedure.

Upon each variation a certain figure of merit (e.g., goal function, cost function) may be formed and observed. The parameter variation may be continued in the direction in which the, e.g., cost function decreases until the cost function has reached a certain predetermined level. After each new desired parameter setting of the equalizers, the procedure can be performed and the desired parameter set can be passed on to an equalizer implementing routine by the parameter setting routine. The actual amplitude response can thus be determined directly, estimated, or simulated and then made the basis of the overall strategy.

This may be achieved by an equalizer system in which external control signals are supplied to the adjustment circuit which then generates corresponding internal control signals for setting, for example, the gains of the equalizers at the respective center frequencies. Here, the internal control signals may be modified relative to the associated external control signals such that the interferences occurring between the equalizers are at least reduced. The external control signals may be a representation of the desired gain parameters, while the internal control signals may represent the actual amplifier parameter sets used for setting the gains of the equalizers.

Additional external control signals may be provided to the adjustment circuit for setting the center frequency and/or the Q factor of each of the equalizers. Both graphic equalizer systems and parametric equalizer systems can be implemented in this way.

The adjustment circuit may generate corresponding additional internal control signals for changing the center frequencies of the equalizers. These signals may be required for use with the associated external control signals.

Further, the adjustment circuit can generate other additional internal control signals for controlling the Q factor of the equalizers. Besides center frequency and gain, the Q factor may be an alternative or additional parameter utilized in an attempt to attain the desired frequency characteristic.

The adjustment circuit may employ an error-reducing technique, in particular a nonlinear error-reducing technique, in which the interferences that occur may be taken as the errors. This error-reducing technique may operate in an iterative manner, thereby facilitating a relatively rapid approach to achieving the desired frequency characteristic.

The other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE INVENTION

Figure 5:
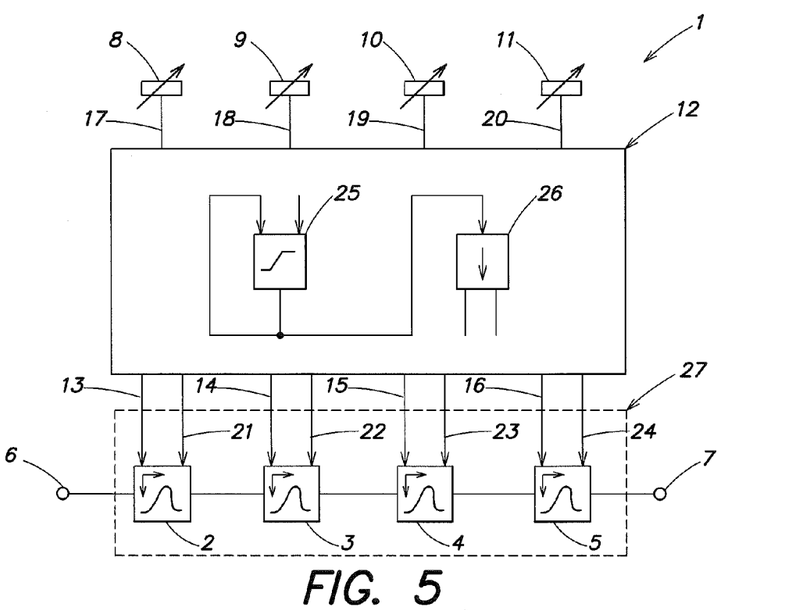
FIG. 5 illustrates an embodiment of an equalizer system having a graphic equalizer bank with a serial structure.

In an embodiment of an equalizer system 1 illustrated in FIG. 5, a graphic equalizer bank 27 includes four individual equalizers 2-5 which may have fixed center frequencies and Q factors. The equalizers 2-5 may be connected in series and provided with an input signal 6, which, when correspondingly equalized, may be present as output signal 7 at the output of the last equalizer 5 in the bank 27.

Further, four controllers 8-11 may be provided with which a desired frequency response is specified by establishing the gains of the individual equalizers 2-5 at their respective center frequencies. The desired gain settings may not, however, be provided directly to the equalizers 2-5, but instead may be provided to an adjustment circuit 12, which then generate internal control signals 13-16 from corresponding external control signals 17-20 provided by the controllers 8-11. On the basis of the internal control signals 13-16, the gain factors at the center frequencies of the equalizers 2-5 are then set as specified by the adjustment circuit 12.

The Q factor of the equalizers 2-5 may also be changed by the adjustment circuit 12 in dependence on the desired settings at the controllers 8-11. This may be performed by additional internal control signals 21-24. As a result, the actual amplitude response of the filter bank 1 may be adapted more closely to the desired setting.

The adjustment circuit 12 may utilize a procedure suitable for real-time use, in which the parameters of the individual equalizers 2-5 may be systematically varied in an iterative manner in accordance with a specified strategy until a desired setting has been found. A certain figure of merit (e.g., goal function, cost function) is formed and evaluated after each parameter variation. The parameter variation is continued in the direction in which the cost function decreases until the cost function has reached a certain predetermined level.

A desired parameter set may be achieved for example with a nonlinear procedure that is executed in a processing unit 25. The nonlinear procedure may be executed after each new desired setting of the equalizer system 1, and the desired parameter set may be provided to an equalizer implementation routine by a setting routine executed in a processing unit 26. The processing units 25 and 26 may be one and the same. The implementation routine can for example also be executed in an additional processing unit, or also, however, in the processing units 25 or 26.

Figure 6:
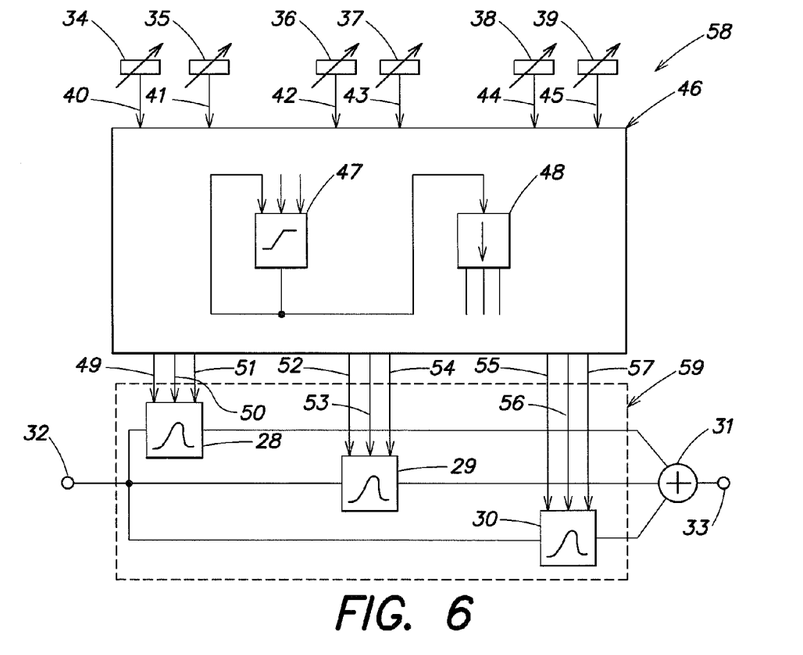
FIG. 6 illustrates an embodiment of an equalizer system having a parametric equalizer bank with a parallel structure.
Figure 7:
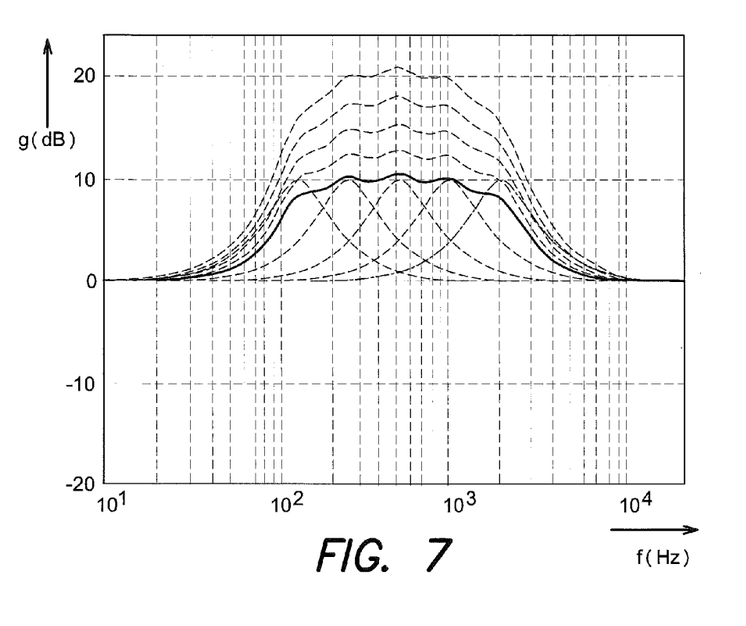
FIG. 7 illustrates a frequency characteristic of the equalizer system of FIG. 5 in contrast with the frequency characteristic illustrated in FIG. 1.

Another embodiment of an equalizer system 58 is illustrated in FIG. 6, in which the equalizer system 58 may have a parametric equalizer bank 59 comprising three individual equalizers 28-30 interconnected in parallel and with an adder 31. An input signal 32 may be provided simultaneously to all three equalizers 28-30, while the outputs of the three equalizers 28-30 may be provided to the adder 31. An output signal 33 caused by equalization of the input signal 32 may be provided at the output of the adder 31.

The desired amplitude response of the equalizer system 58 may be set with six controllers 34-39. The six controllers 34-39 may be divided into three groups of two controllers, each group being assigned to a respective one of the equalizers 28-30. Within each group there may be one controller 34, 36, 38 for setting the respective desired center frequencies, while the other controller 35, 37, 39 in each group sets the gain at the associated desired center frequency. The controllers 34-39 may generate a first group of external control signals 41, 43, 45 for controlling the gain and a second group of external control signals 40, 42, 44 for controlling the center frequencies. The control signals 40-45 may be supplied to an adjustment circuit 46, which, similar to the adjustment circuit 12 in FIG. 5, may include first and second processors 47, 48. There may be an additional processor for performing an implementation routine and thus for ultimately setting the equalizers 28-30. As such, the setting and implementation routines may be handled by the processors 47, 48.

Further, there may also be a third group of external control signals (not shown) for setting the desired Q factor. The third group of external control signals are likewise provided to the adjustment circuit 46 and consequently become the basis for the desired parameter set.

The adjustment circuit 46 may generate a first group of internal control signals 49, 52, 55 and a second group of internal control signals 50, 53, 56 for setting the center frequency and gain, respectively, of the equalizers 28-30, and, if necessary, a third group of internal control signals 51, 54, 57 for controlling the Q factor.

The mode of operation of the adjustment circuits 12, 46 may be described as a procedure for solving a nonlinear problem in general and a nonlinear curve fitting in particular. In the context of curve fitting, the desired gains can be interpreted as sample values of a desired amplitude response that may be approximated by a model function.

Consider first an equalizer bank made up of a certain number of equalizers connected in series, for example the equalizer bank 27 of FIG. 5. It may be assumed that the gains (in dB) of the individual equalizers 2-5 at their respective center frequencies are fixed and specified. Further, certain desired gains of the equalizer bank at several intermediate frequencies may be assumed, specifically one between every two adjacent center frequencies.

The gains at the center frequencies and those at the frequencies lying therebetween may be taken as the data set for curve fitting. The sum of the logarithms of the formally expressed amplitude responses (in dB) of the individual equalizers, with gain, Q factor and center frequency, still unknown parameters, may be taken as the curve-fitting function (model function).

The next step may be the selection of a suitable procedure, for example, a curve-fitting procedure or a minimization procedure. For example, numerous iterative optimization techniques such as for example Newton methods, gradient methods, and coordinate exchange methods are described in D. A. Pierre, *Optimization Theory with Applications*, John Wiley and Sons, New York 1969. In the present case, for real-time implementation, a coordinate exchange method is chosen because of its relatively slight complexity. However, alternative procedures can be employed.

Next a measure (norm) for the quality of curve fitting may be selected. An example may be the Euclidean norm, that is, the square root of the sum of the squares, i.e., the square root of the sum of the squares of all the deviations of the model function from the data points and thus the square root of the sum of all squared errors. Further, a condition for terminating the iteration and finally suitable initial values for the unknown parameters may be defined. The curve-fitting procedure may then be run in an iterative loop until a condition for terminating the iteration is encountered.

The N desired gains (in dB) $G_i$, $I=1, 2, \ldots, N$, at the corresponding center frequencies $F_{ci}$, $I=1, 2, \ldots, N$, and additionally $N-1$ suitably predicted and desired gains (in dB) $G_{mi}$, $I=1, 2, \ldots, N-1$, each at a favorably selected intermediate frequency $F_{mi}$, $I=1, 2, \ldots, N$, may be defined as the set of data points to be subjected to curve fitting.

The resulting $2N-1$ data points can be assumed as elements of a data point vector:

$$\bar{y}^T = (\tilde{G}_1, \tilde{G}_2, \ldots \tilde{G}_{2N-1}),$$

$$\tilde{G}_{2i-1} = G_i, i=1,2,\ldots,N; \tilde{G}_{2i} = G_{mi}, i=1,2,\ldots,N-1$$

where the vector for the associated frequency points is:

$$\bar{x}^T = (\tilde{F}_1, \tilde{F}_2, \ldots \tilde{F}_{2N-1}),$$

$$\tilde{F}_{2i-1} = F_{ci}, i=1,2,\ldots,N; \tilde{F}_{2i} = F_{mi}, i=1,2,\ldots,N-1$$

The data point vector is also used in determining the measure of quality for curve fitting at each iteration step, by calculating the Euclidean distance of this vector from the corresponding vector of the values given by the model function described below.

To form the model function, consider an equalizer bank with N equalizers connected in series (e.g., conventional analog devices for simplicity) with the unknown parametric center frequencies $F_{ci}$, gains $G_i$ (in dB) with $G_i = 20 \log A_i$, and Q factors $Q_i$, $i=1, 2, \ldots, N$. Each individual equalizer has the frequency-domain transfer function:

$$H_i(f) = \frac{1 - (f/Fc_i)^2 + j(A_i/Q_i)(f/Fc_i)}{1 - (f/Fc_i)^2 + j(1/Q_i)(f/Fc_i)}, \quad i = 1, 2, \ldots, N$$

and thus the logarithmic amplitude response function (in dB):

$$Me_i(f) = 10 \log \{[1-(f/Fc_i)^2]^2 + (A^2_i/Q^2_i)(f/Fc_i)^2\} - 10 \log \{[1-(f/Fc_i)^2]^2 + (1/Q^2_i)(f/Fc_i)^2\}$$

The model function $M(\bar{p}, f)$ for the curve fitting problem may be based on the net amplitude response (in dB) of the equalizer bank (made up of N individual equalizers):

$$M(\bar{p}, f) = \sum_{i=1}^{N} Me_i(Fc_i, G_i, Q_i, f)$$

where the unknown parameter vector is:

$$\bar{p}^T = (Fc_1, G_1, Q_1, \ldots Fc_N, G_N, Q_N)$$

With this function the curve fitting may now be performed as described above on the basis of the set of data points (data point vector).

The well-known sum of squares measure $$D(\bar{p}) = \sum_{i=1}^{2N-1} \left[ M(\bar{p}, f = \tilde{F}_i) - \tilde{G}_i \right]^2$$

may be utilized as the measure of the quality of curve fitting in each iteration step.

This measure is also frequently referred to as a cost function, and as the measure based on the L2 norm. Alternative norms such as for example the minimax norm can also be employed.

With regard to a vector-space description, the variable parameters can be taken as independent coordinates of a vector space. Each arbitrary parameter vector may point to a point in this space. Every point in this space may then be transformed to some positive number, namely the Euclidean distance (the curve fitting measure), by the model function in conjunction with the cost function. A point in the parameter space may be sought that exhibits the shortest Euclidean distance in the simplified sense.

The interference compensation problem to be solved can be viewed as a nonlinear minimization problem according to the least-squares method. It is nonlinear because the model function, similarly to the cost function, depends on the parameters in a nonlinear way. Thus what is sought is the parameter vector $p_0$ that minimizes the cost function D(p):

Minimize $D(\bar{p})$!

with some $\bar{p}_o = (Fc_{1o}, G_{1o}, Q_{1o}, \ldots, Fc_{No}, G_{No}, Q_{No})$ In most cases nonlinear minimization problems may be solved through the use of a numerical iterative procedure. An important fundamental problem in all nonlinear optimization procedures is that the cost function may exhibit not a unique global minimum but various local minima. This must also be taken into account for the present applications.

As mentioned, it is important to find a parameter vector that minimizes the cost function. To reach this goal, a suitable fast-searching minimization strategy may first be established, the condition for termination of the iteration may be defined, and suitable initial values of the parameters may be set for the first iteration round.

Numerous minimization procedures are described in the prior art; these can essentially be broken down into three categories: Newton methods, gradient methods, and coordinate exchange methods.

Coordinate exchange procedures are slow but have the advantage of relatively slight complexity. The procedure can be briefly outlined as follows. In each iteration step, the parameters, one after another, may be incremented and then decremented by a certain amount. After each parameter is changed, the model function may be calculated and from this, the cost function may be calculated with the use of the temporarily changed parameter. Next, a test may be performed to determine whether the parameter changes increase or decrease the cost function. If the cost function is decreased, the current parameter may be set according to the positive or negative amount; otherwise it may be left unchanged. In the same way, the next parameter may be changed and the dependent cost function determined.

After all of the parameters have been run through in this manner, the iteration loop may be repeated with the use of the new parameter vector, and this may be done repetitively until the condition for the termination of the iterations is satisfied. The iterative procedure may then be terminated.

Before the iterative procedure is begun, however, suitable initial values of the unknown parameters must be set for the first iteration. In nonlinear optimization procedures in general, this operation may be a relatively problematic step because a poorly chosen initial parameter set ends, in the worst case, in the algorithm diverging. The initial values may therefore be selected to make the iterative process converge as rapidly as possible to at least a local minimum.

The equalizer system can be used with an arbitrary system structure in conjunction with both graphical and parametric equalizer banks. For simplicity, the explanation in the case of the frequency characteristics of FIGS. 7-10 may be with a graphic equalizer bank with ten octave bands. In this case the gains and Q factors of the individual equalizers may be taken as the variable parameter vector of the model function. The center frequencies may be fixed for the analysis that follows; that is, they may not be used as elements of the change of parameters. Further, the corresponding desired settings may be taken as the basis for the initial values of the parameters in the present case.

The gains and the Q factors of the individual equalizers may then be utilized as elements of the parameter vector; these values form the system of coordinates for the space over which the minimum cost function is sought. The coordinate exchange procedure may operate in the following manner.

As mentioned, various types of equalizer parameters may be available, namely the gains and the Q factors, both of which can be varied to reach an optimum parameter set. First, for example, the optimization procedure may be performed with variations of the gains only, then the procedure may be repeated with the Q factors. A condition for the termination of iteration may be established at the beginning of the gain and Q factor optimization procedure.

Each iteration step may begin with, for example, an increase followed by a decrease of the gains (or respectively the Q factors), and specifically of one gain (or respectively one Q factor) after another, by a certain amount. This way, the parameter vector may be varied one element after another, and the net frequency response may be calculated or estimated upon each variation of an element, where the cost function is calculated and tested against a condition for the termination of iteration. The iteration loop is stopped as soon as the termination condition is satisfied, otherwise, the loop is continued.

The differences in the amplitude response with and without use of the equalizer system with the adjustment circuit 12 and corresponding procedures described above are compared in FIGS. 1 and 7. The desired setting may be taken as the basis for the initial parameter set, from which FIG. 1 also commences. To reduce the pronounced peakings, the gains may be varied, iteratively, as described above. The result can be seen in FIG. 7, with dotted lines illustrating intermediate results and solid lines illustrating the final result. The step size for the gain is 1 dB, and satisfactory results may be obtained after just four iteration rounds.

Figure 8:
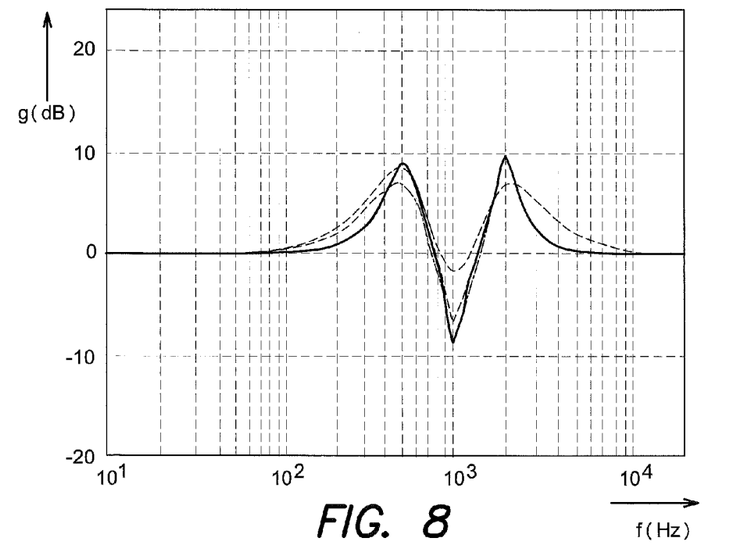
FIG. 8 illustrates a frequency characteristic of the equalizer system of FIG. 5 in contrast with the frequency characteristic illustrated in FIG. 2.

Proceeding from FIG. 2, an attempt may be made, as illustrated in FIG. 8, to compensate for the interference effects by varying the Q factors. Here the Q factors may be varied in the range between 1.4 and 2.6 or respectively between 0.8 and 1.4. As can be seen, the desired gain settings may be realized essentially without significant deviation.

In the more complex embodiment that resulted in the frequency characteristic of FIG. 3, both gain variations and also variations of the Q factor are employed for its optimization. The gain steps were set at 0.5 dB. The optimization procedure converges to a net amplitude response (not shown) that may depart far from the desired actual gain setting at some points. The corresponding cost function (not shown) moves to a minimal value that cannot be further reduced by further iteration loops. Thus a curve fit (interference compensation) may not be satisfactorily achieved with gain variation alone.

Figure 9:
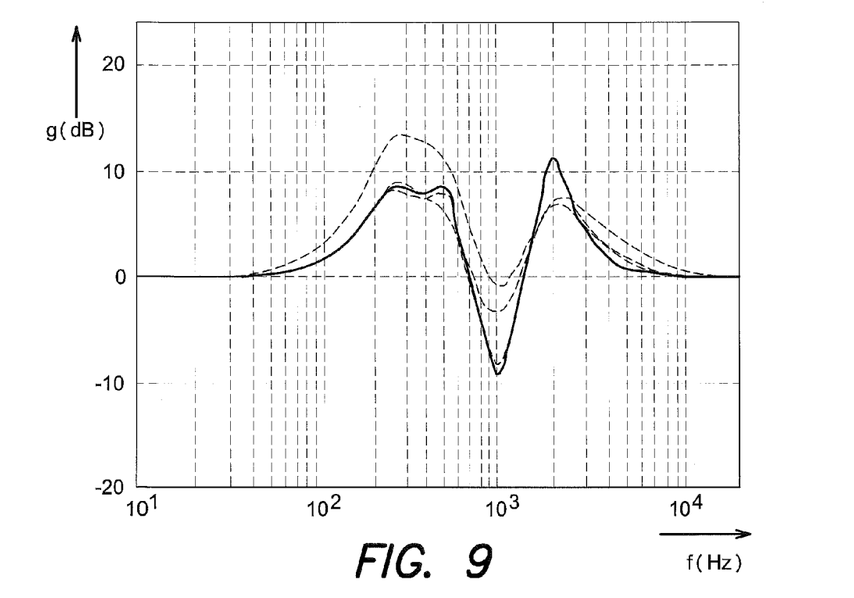
FIG. 9 illustrates a frequency characteristic of the equalizer system of FIG. 5 in contrast with the frequency characteristic illustrated in FIG. 3.

The results of the net amplitude response are illustrated in FIG. 9, where the dotted line illustrates intermediate results and the solid line illustrates final results. A Q factor variation may be utilized in the optimization procedure along with a gain variation. In the present example, an acceptable net amplitude response is obtained after three gain iterations and eight Q factor iterations.

Figure 10:
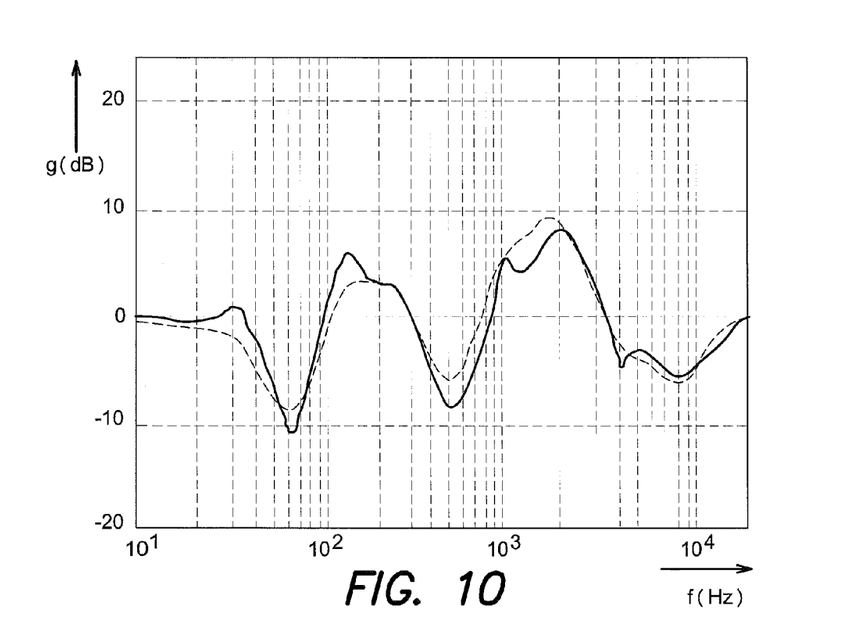
FIG. 10 illustrates a frequency characteristic of the equalizer system of FIG. 5 in contrast with the frequency characteristic illustrated in FIG. 4.

Finally, the optimization procedure may be applied with combined gain and Q factor variation for the setting illustrated in FIG. 4. The resulting net amplitude response is illustrated in FIG. 10 (solid line) in comparison with the initial, net amplitude response (dashed line) from FIG. 4. For clarity, the intermediate results are not illustrated.

Thus it has been shown that the equalizer system with the adjustment circuit and corresponding procedures sets an actual transfer behavior that essentially corresponds to the desired setting. The equalizer system with the adjustment circuit and corresponding procedures invention is not, however, limited only to iterative systems but can also be implemented by neural networks or through fuzzy logic.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. An equalizer system that generates an output signal by equalizing an input signal, comprising:
   at least two interconnected and mutually interfering equalizers having different center frequencies, where an adjustable gain and an adjustable Q-factor of each of the equalizers at the respective center frequency of the equalizer are controlled by a first group of external control signals; and
   a non-linear adjustment circuit that generates a first group of internal control signals from the first group of external control signals, where the first group of internal control signals set the gain and the Q-factor of the equalizers at the respective center frequency of each of the equalizers, and
   where the first group of internal control signals are modified relative to the first group of external control signals such that the adjustable gain and the adjustable Q-factor for at least one of the equalizers is automatically adjusted to reduce interferences occurring between the equalizers.

2. The equalizer system of claim 1, where each of the equalizers has an associated center frequency that is controlled by a second group of external control signals, where the non-linear adjustment circuit generates a second group of internal control signals from the second group of external control signals, where the second group of internal control signals set the center frequency of each of the equalizers, and where the second group of internal control signals are modified relative to the second group of external control signals such that the interferences occurring between the equalizers are reduced.

3. The equalizer system of claim 1, where the at least two equalizers are connected in series.

4. The equalizer system of claim 1, where
   the non-linear adjustment circuit executes an error-reducing procedure in which the interferences occurring between the equalizers are taken as the errors.

5. The equalizer system of claim 4, where the error-reducing procedure executed by the non-linear adjustment circuit comprises a nonlinear error-reducing procedure.

6. The equalizer system of claim 5, where the error-reducing procedure executed by the non-linear adjustment circuit operates in an iterative manner.

7. The equalizer system of claim 5, where the nonlinear error-reducing procedure comprises a curve fitting.

8. An equalizer system, comprising:
   at least two equalizers; and
   a non-linear adjustment circuit that generates an internal control signal from an external control signal, the internal control signal being used for adjusting parameters including a Q-factor associated with a frequency response of at least one of the equalizers, where the non-linear adjustment circuit provides the internal control signal with respect to the external control signal such that the Q-factor for at least one of the equalizers is automatically adjusted to reduce interferences occurring between the equalizers, where the Q-factor is adjusted according to a cost function.

9. The equalizer system of claim 8, where the parameter comprises a gain.

10. The equalizer system of claim 8, where the parameter comprises a center frequency.

11. The equalizer system of claim 8, where the non-linear adjustment circuit executes an error-reducing procedure, where the interferences occurring between the equalizers comprise the errors.

12. The equalizer system of claim 11, where the error-reducing procedure comprises a nonlinear error-reducing procedure.

13. The equalizer system of claim 11, where the non-linear adjustment circuit executes the error-reducing procedure in an iterative manner.

14. The equalizer system of claim 12, where the nonlinear error-reducing procedure comprises a curve fitting.

15. An equalizer system, comprising:
    at least two equalizers;
    at least two controllers, each of which provides an external control signal; and
    a non-linear adjustment circuit that generates an internal control signal for each one of the equalizers from a corresponding one of the external control signals, the internal control signal being used for adjusting parameters including a Q-factor associated with a frequency response of the corresponding one of the equalizers, where the non-linear adjustment circuit provides the internal control signal as a function of the external control signal such that the Q-factor for at least one of the equalizers is automatically adjusted to reduce interferences occurring between at least two of the equalizers.

16. The equalizer system of claim 15, where the parameter is from a group comprising a gain, a center frequency, and a Q factor.

17. The equalizer system of claim 15, where the non-linear adjustment circuit provides a value of the internal control signal by executing an error-reducing procedure to reduce the interferences between the at least two equalizers.

18. The equalizer system of claim 17, where the error-reducing procedure comprises a nonlinear error-reducing procedure.

19. The equalizer system of claim 17, where the non-linear adjustment circuit executes the error-reducing procedure in an iterative manner.

20. The equalizer system of claim 18, where the nonlinear error-reducing procedure comprises a curve fitting.

21. A method for reducing interference occurring between at least two equalizers connected together, the method comprising:

receiving an external control signal indicative of a desired value of parameters including an adjustable Q-factor of the equalizers;

non-linearly operating on the external control signal such that the adjustable Q-factor is automatically adjusted to reduce the amount of the interference occurring between the at least two equalizers; and providing an internal control signal to each of the equalizers, the internal control signal being indicative of a result of the operation performed on the external control signal.

22. The method of claim 21, where the parameter comprises a gain.

23. The method of claim 21, where the parameter comprises a center frequency.

24. The method of claim 21, where the step of operating comprises a step of executing an error-reducing procedure in which the amount of the interferences occurring between the equalizers comprise the errors.

25. The method of claim 24, where the error-reducing procedure comprises a nonlinear error-reducing procedure.

26. The method of claim 24, where the step of executing an error-reducing procedure executes the error-reducing procedure in an iterative manner.

27. The method of claim 25, where the nonlinear error-reducing procedure comprises a curve fitting.

28. The equalizer system of claim 1, where the equalizers are configured in parallel.

* * * * *